US008765627B2

(12) United States Patent
Cramail et al.

(10) Patent No.: US 8,765,627 B2
(45) Date of Patent: Jul. 1, 2014

(54) CATALYST SYSTEM, METHOD OF MANUFACTURE AND USE

(75) Inventors: Henri Cramail, Sainte Terre (FR); Cécile Bouilhac, Notre Dame de Sanilhac (FR); Eric Cloutet, Saint Caprais de Bordeaux (FR); Daniel Taton, Camarsac (FR); Alain Deffieux, Bordeaux (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 681 days.

(21) Appl. No.: 12/665,127

(22) PCT Filed: Jun. 12, 2008

(86) PCT No.: PCT/FR2008/000807
§ 371 (c)(1),
(2), (4) Date: Feb. 4, 2010

(87) PCT Pub. No.: WO2009/007544
PCT Pub. Date: Jan. 15, 2009

(65) Prior Publication Data
US 2010/0190944 A1    Jul. 29, 2010

(30) Foreign Application Priority Data
Jun. 18, 2007   (FR) ...................... 07 04328

(51) Int. Cl.
*B01J 31/06*   (2006.01)
*C08F 4/02*    (2006.01)
*C08F 4/642*   (2006.01)
*C08F 4/70*    (2006.01)
*C08F 10/02*   (2006.01)

(52) U.S. Cl.
USPC ...... 502/159; 502/107; 502/109; 502/527.24; 526/160; 526/169.1; 526/170; 526/171; 526/201; 526/904

(58) Field of Classification Search
USPC ............... 526/904, 160, 169.1, 170, 201; 502/107, 109, 527.24, 171
See application file for complete search history.

(56) References Cited

U.S. PATENT DOCUMENTS 6,852,816 B2 * 2/2005 Lewis et al. .................. 526/277

FOREIGN PATENT DOCUMENTS

WO    WO 97/23288    7/1997

OTHER PUBLICATIONS

Cecile Bouilhac et al., Benzophenone-Functionalized, Starlike Polystyrenes as Organic Supports for a Tridentate Bis(imino) Pyridinyliron/Trimethylaluminum Catalytic System for Ethylene Polymerization, Journal of Polymer Science: Part A: Polymer Chemistry, 2006, pp. 6997-7007, vol. 44, Wiley InterScience.
Cecile Bouilhac et al., Functionalized Star-Like Polystryrenes as Organic Supports of a Tridentate Bis(imino)pyridinyliron/Aluminic Derivative Catalytic System for Ethylene Polymerization, Macromolecular Rapid Communications 2005, pp. 1619-1625, vol. 26, Wiley-VCH Verlag GmbH & Co. KGaA.
Wenqin Wang et al., Novel Polystyrene-Supported Zirconocene Catalyst for Olefin Polymerization and Its Catalytic Kinetics, Journal of Polymer Science: Part A: Polymer Chemistry, 2005, pp. 2650-2656, vol. 43, Wiley InterScience.
Jianhui Xia et al., Synthesis of Star-Shaped Polystyrene by Atom Transfer Radical Polymerization Using an "Arm First" Approach, Macromolecules, 1999, pp. 4482-4484, vol. 32, American Chemical Society.
Cecile Bouilhac et al., Functional Star-Like Polystryrenes as Organic Supports of MeDIP(2,6-iPrPh)$_2$FeCl$_2$ Catalyst Toward Ethylene Polymerization, Macromolecular Chemistry and Physics, 2007, pp. 1349-1361, vol. 208, Wiley-VCH Verlag GmbH & Co. KGaA.
A.K. Rappe et al., "Modeling Metal-Catalyzed Olefin Polymerization", Chem. Rev., 2000, vol. 100, pp. 1435-1456.
Anthony G. Barret et al., "Synthesis and Characterization of a New Polymer Support for a Metallocene Catalyst", Tetrahedron, 2002, vol. 58, pp. 3785-3792.
George J. P. Britovsek et al., "Novel Olefin Polymerization Catalysts Based in Iron and Cobalt", Chem. Commun., 1998, pp. 849-850.
Hansjorg Sinn et al., "Living Polymers" on Polymerization with Extremely Productive Ziegler Catalysts, 1980, Angew. Chem. Int. Ed. Engl., vol. 19, No. 5, pp. 390-392.
Hansjorg Sinn et al., "Ziegler-Natta Catalysis", Adv. Organomet. Chem., 1980, vol. 18, pp. 99-149.
Kazuo Soga et al, "Propene Polymerization with Zirconocene Catalysts Supported on Siloxane Copolymers", Macromol. Chem. Phys., 1997, vol. 198, pp. 2779-2787.
Lynda K. Johnson et al., "New Pd(II)- and Ni(II)-Based Catalysts for Polymerization of Ethylene and a-Olefins", J. Am. Chem. Soc., 1995, vol. 117, pp. 6414-6415.
Steven D. Ittel et al., "Late-Metal Catalysts for Ethylene Homo- and Copolymerization", Chem. Rev., 2000, vol. 100, pp. 1169-1203.
Takashi Ishizone et al., "Protection and Polymerization of Functional Monomers. 13. Anionic Living Polymerization of Tert-Butyl 4-Vinylbenzoate", Macromolecules, 1989, vol. 22, pp. 2895-2901.

(Continued)

*Primary Examiner* — Fred M Teskin
(74) *Attorney, Agent, or Firm* — Arent Fox LLP

(57) ABSTRACT

The present invention relates to a catalyst system, to a method of manufacturing this system, and also to uses of this system. The catalyst system of the invention is characterized in that it comprises molecules of a polymer having, at one of its ends or along the chain, one or more polar functional groups; a solvent, said solvent, due to the fact of said polar functional group of said polymer, provoking and maintaining, when said molecules of the polymer are introduced thereinto, an organization of said molecules of the polymer into aggregates, micelles or vesicles so that the polar functional groups of said polymer are located inside the aggregates, micelles or vesicles formed; and a catalyst activator and a catalyst trapped in said aggregates, micelles or vesicles of said polymer. The catalyst system of the present invention may be used, for example, for catalyzing a (co)polymerization of olefins.

21 Claims, 4 Drawing Sheets

(56) References Cited

OTHER PUBLICATIONS

Takashi Ishizone et al., "Protection and Polymerization of Funtional Monomers, 22a) Synthesis of Well-Defined Poly(4-Vinylbenzoic Acid) By Means of Anionic Living Polymerization of N-(4-Vinylbenzoyl)-N1-Methylpiperazine, Followed by Deprotection", Macromol. Chem. Phys., 1994, vol. 195, pp. 3173-3187.

Takashi Ishizone et al., Anionic Polymerization of Monomers Containing Functional Groups. 6. Anionic Block Copolymerization of Styrene Derivatives Para-Substituted with Electron-Withdrawing Groups, Macromolecules, 1993, vol. 26, pp. 6964-6975.

Vernon C. Gibson et al., "Advances in Non-Metallocene Olefin Polymerizatiion Catalysis", Chem. Rev., vol. 103, pp. 283-315, (2003).

* cited by examiner

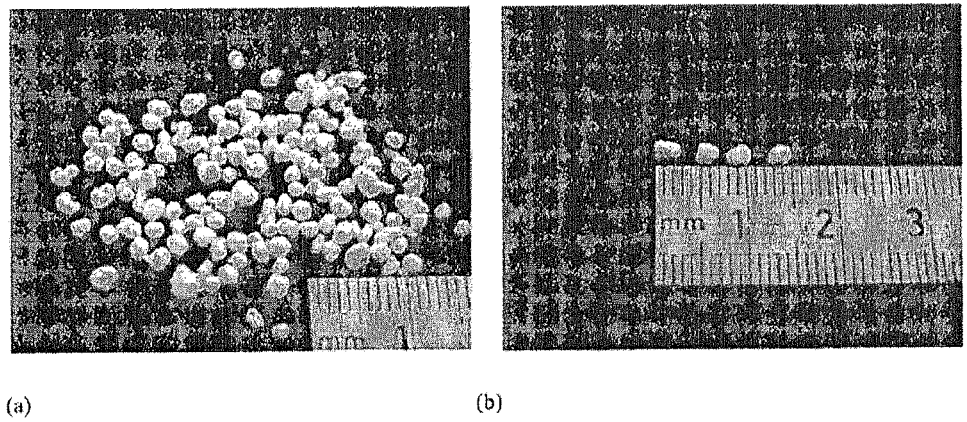
Figure 6a and b
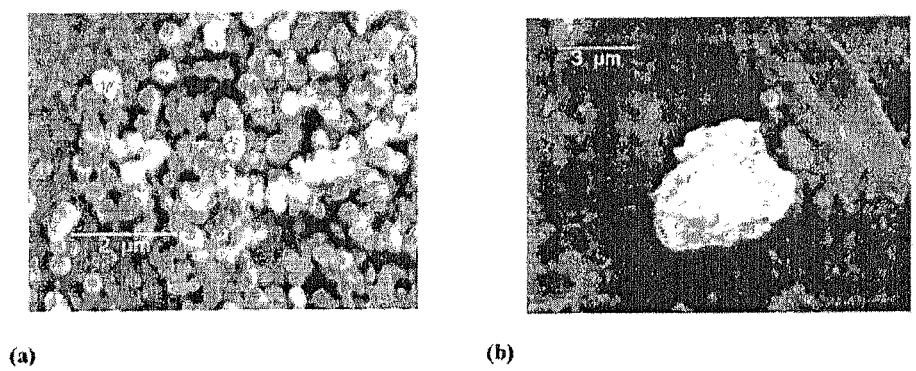
Figure 7a and b

CATALYST SYSTEM, METHOD OF MANUFACTURE AND USE

CROSS-REFERENCE TO RELATED APPLICATION

This application is a National Stage entry of International Application No. PCT/FR2008/000807, filed Jun. 12, 2008, which claims priority of French application Ser. No. 07/04328, filed Jun. 18, 2007. The disclosure of the prior application is hereby incorporated in its entirety by reference.

The present invention relates to a catalytic system, to a method of manufacturing this system, and to uses of this system.

The catalytic system of the present invention can be used for example for catalysing a polymerisation of olefins.

The main application of the present invention are therefore found in the industry of polyolefins, for example polyethylene and polypropylene.

In the field of polyolefins, catalysis research is particularly active. By way of example, the expenditure on research on catalysts by the largest producers of polyolefins reached 1 billion dollars annually solely for metallocene catalysts, that is to say 75% of all the expenditure made over a year by these companies in the field of research on polyolefins. With regard to metallocenes, the cost of the co-catalyst is one of the major brakes on a greater economic development of these catalysts.

In 2003, some of the largest producers of polyolefins initiated a movement for externalising research and the supply of catalysts.

The polyolefin industry if one of the main consumers of catalysts. The net sales of catalysts, such as those of Ziegler-Natta (registered trade mark), specific to polyolefins, was 1129 million dollars in 2004, and for single-site catalysts of the metallocene type, they reached 44 million dollars in 2004. The sales of two major products commercially obtained via these catalysts correspond to a market of 65 million tonnes of polyethylene experiencing an annular growth rate of 4% to 5% per annum and an annual market of 42 million tonnes of polypropylene with an annual growth rate of 5% to 7%.

Catalysts of the Zeigler Natta type continue to dominate this market because of their low cost and improvements made to them continuously. They consist of a halogenated compound of a transition metal of groups 4 or 5, such as titanium or vanadium, and an alkylated compound of a metal in groups 1, 12 or 13, for example beryllium, magnesium or zinc. It may be a case for example of $TiCl_4$ and $Al(C_2H_5)_3$. They generally make it possible to produce more than 30 kg of polymer per gram of catalyst. These catalysts are generally deposited on solid crystalline carriers, for example alumina or silica. The catalysts are dispersed in the polymer after reaction.

The catalytic systems used for the polymerisation of olefins (ethylene, propylene, etc) generally consist of the association of a metallic complex issuing from groups 4 to 10 in the periodic table and an aluminic activator. By way of example, the activation of a zirconocene (sandwich metal) by methylaluminoxane (MAO), the conventionally used activator, leads to the formation of active species capable of polymerising the olefins by a coordination/insertion mechanism as illustrated in diagram 0 below.

Diagram 0: activation of a zirconocene by methylaluminoxane (MAO) and formation of active species capable of polymerising the olefins by a coordination/insertion mechanism

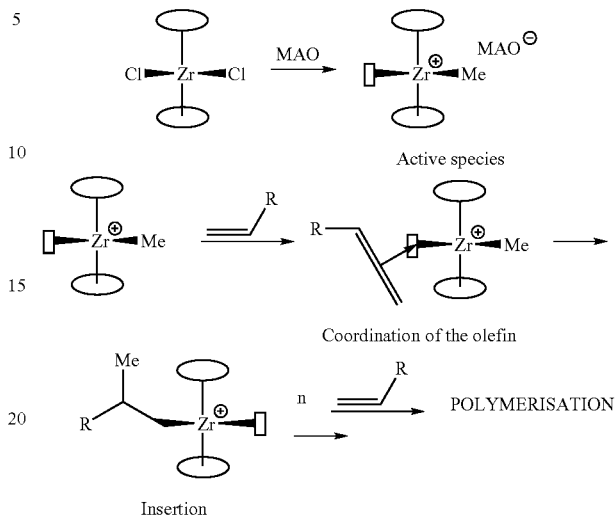

The role of the aluminic activator is essential in the polymerisation process. The synthesis of the MAO generally takes place by gentle hydrolysis of trimethylaluminium (TMA). More recently, studies showed that a non-hydrolytic reaction between TMA and benzoic acid (BA) at 60° C. for several hours led to the formation of an aluminic derivative with a structure close to that of MAO, as illustrated below in diagram 1:

Diagram 1: synthesis of the methylaluminoxane (MAO) activator by reaction between trimethylaluminium (TMA) and benzoic acid

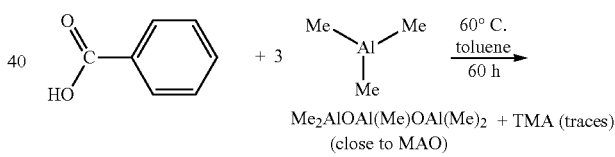

The MAO issuing from the reaction between TMA and benzoic acid [$Me_2AlOAl(Me)OAlMe_2$] proves to be an effective activator of metallocenes and more recently developed catalysts termed post-metallocenes.

The synthesis of polyolefins, for example polyethylene, polypropylene and copolymers thereof, on an industrial scale is mainly carried out in a heterogeneous environment, that is to say using a carrier on which the catalytic system is deposited or "constructed". In general, this carrier is of the inorganic type, for example consisting of silica, alumina, magnesium dichloride, etc, which remains in the trace state in the polymer after polymerisation around the carrier, which can alter certain properties of the final material.

Thus one of the main limitations of these techniques of the prior art concerns the presence of residues of carriers in the synthesised polymer material, which may alter the thermo-mechanical and optical (transparency) properties of the final material. Another limitation is the high cost of the inorganic carriers used in the prior art. Finally, a third limitation is that the carriers used in the prior art do not make it possible to support all the catalytic systems developed, which greatly limits the use of the latter.

For a few years, manufacturers have been studying the use of "softer" organic carriers as substitutes for inorganic carriers, but no convincing result has been achieved.

There exists therefore a real need for a catalyst that is at the same time simple to manufacture, easy to use and of reduced cost, and that can be used in very low concentrations for equivalent or even superior catalytic activity, than catalysts of the prior art.

DISCLOSURE OF THE INVENTION

The aim of the present invention is precisely to meet this need by providing a catalytic system characterised in that it comprises:
- molecules of a polymer comprising at one of its ends a polar function;
- a solvent, said solvent, because of the said polar function of the said polymer, causing and maintaining, when the said molecules of the polymer are introduced therein, an organisation of the said molecules of the polymer in aggregates, micelles or vesicles so that the polar functions of the said polymer are situated inside the aggregates, micelles or vesicles formed; and
- a catalyst activator and a catalyst confined in the said aggregates, micelles or vesicles of the said polymer.

The present invention also provides a method of manufacturing the catalytic system of the invention, the method comprising the following steps:
(a) choosing a polymer comprising a polar function at one of its ends and capable of being organised in a suitable solvent so as to form aggregates, micelles or vesicles so that the polar functions of the said polymer are situated inside the aggregates, micelles or vesicles;
(b) choosing the suitable solvent or reaction medium so that it causes and maintains, when molecules of the polymer are introduced therein, an organisation of said molecules of the polymer in aggregates, micelles or vesicles so that the polar functions of the said polymer are situated inside the aggregates, micelles or vesicles formed;
(c) introducing the said solvent on the molecules of the polymer so that the polymer molecules are organised in aggregates, micelles or vesicles;
(d) adding the catalyst activator which, because of the polar functions of the polymer molecules, diffuses in the said aggregates, micelles or vesicles formed in order to interact therein with the said functions and to be immobilised therein; and in the order (e) and then (f) or (f) and then (e)
(e) introducing monomer, preferably continuously, preferably until the solvent is saturated with monomer;
(f) introducing the catalyst in the solvent, the said catalyst diffusing in the said aggregates, micelles or vesicles in order to form the said catalytic system.

According to the invention, the polymer can be any polymer enabling the present invention to be implemented. It can be chosen for example from the group comprising polystyrene; polyolefins, for example polyethylene, poly(alpha-olefins), polyisobutene and polypropylene.

According to the invention, the polymer may be a linear block copolymer or a statistical polymer.

"Block copolymer" means in the present document a sequenced polymer comprising more than one species of monomer. In a block copolymer, identical monomers are grouped together.

Such polymers and the manufacturing method thereof are described for example in Matyjaszewski, K.; Eds; Advances in Controlled/Living Radical Polymerization, (American Chemical Society 2003) [1] or Hsieh H. L.; Quirk, R. P.; Eds.; Anionic Polymerization Principles and Practical Applications, (Marcel Dekker 1996) [2].

"Statistical copolymer" means in the present document polymer in which the various monomers fix according to the reactivity and concentration thereof. Such polymers and the manufacturing methods thereof are described for example in Matyjaszewski, K.; Davies, T. P; Eds.; Handbook of Radical Polymerization, (Wiley-Interscience 2002) [3] or Fontaine, L.; Initiation in Macromolecular Chemistry and Physicochemistry (French Polymer Study and Application Group volume 12 (chapter 3)) [4].

According to the invention, when it is a case of a block copolymer, it may be a case for example of a diblock copolymer synthesised for example by controlled radical polymerisation or by living anionic polymerisation or by living cationic polymerisation or a statistical copolymer synthesised by controlled radical polymerisation or non-controlled radical polymerisation.

Controlled radical polymerisation (CRP) is a method of choice for preparing clearly defined polymers and copolymers with adjustable molar masses and low polymolecularity indices. Techniques that can be used in the present invention are described for example in Matyjaszewski, K.; Davies, T. P; Eds.; Handbook of Radical Polymerization, (Wiley-Interscience 2002) [3].

"Living polymerisation" means a polymerisation in which there are neither termination reactions nor transfer reactions, and where the polymer chains continue to grow as long as there remain monomer molecules to be added to the chains. According to the invention, living polymerisation may be cationic or anionic. Such methods are described for example in Matyjaszewski, K.; Eds; Cationic Polymerization Mechanisms, Synthesis, and Applications (Marcel Dekker 1996) [5] or Hsieh H. L.; Quirk, R. P.; Eds.; Anionic Polymerization Principles and Practical Applications, (Marcel Dekker 1996) [2].

According to the invention, the polymer may for example be a linear polystyrene carrying a benzoic acid function or a poly(styrene-b 4-vinyl benzoic acid) diblock copolymer. Examples of polymers that can be used in the present invention and methods enabling synthesis thereof are described for example in the documents such as Ishizone, T.; Kurosawa, H.; Hirao, A.; Nakahama, S.; Macromol. Chem. Phys 195, 3173 (1994) [6] or Ishizone, T.; Hirao, A. Nakahama, S., Macromolecules, 22, 2895 (1989) [7] or Ishizone, T.; Hirao, A.; Nakahama, S., Macromolecules, 26, 6964 (1993) [8].

According to the invention, whatever the polymer used, the polar function can be chosen for example from the group comprising a benzoic acid function, an alcohol function, a phenol function, an ester function, a ketone function.

The polar function can be fixed on the polymer by any suitable organic chemistry method known to persons skilled in the art. Preferably a method is used for forming or fixing the polar function on the polymer at one of its ends.

Methods than can be used for fixing or forming the said polar functions on the said polymers are described for example in the documents such as Hsieh, H. L.; Quirk, R. P.; Eds.; Anionic Polymerization Principles and Practical Applications, (Marcel Dekker 1996) [2] or Matyjaszewski, K.; Eds.; Advances in Controlled/Living Radical Polymerization, (American Chemical Society 2003) [1] or Matyjaszewski, K.; Davies, T. P; Eds.; Handbook of Radical Polymerization, (Wiley-Interscience 2002) [3].

According to the invention, the solvent can be chosen for example from the group comprising ethylbenzene, toluene, hexane, isododecane, heptane or any other higher alkane.

In fact, as indicated above, in the present invention, the polar function and the solvent are chosen so that the formation of aggregates and/or micelles and/or vesicles is obtained and in general terms of any supramolecular structure of the polymer comprising the said polar function in the said solvent when the polymer is mixed with the solvent. This supramolecular structure makes it possible for example to immobilise a catalyst and a catalyst activator, for example those used in polymerisation, for example olefins.

According to the invention, the activator of the catalyst can be any activator known to persons skilled in the art enabling the present invention to be implemented. It may be a case for example of a catalyst activator chosen from the group comprising an aluminic activator, an activator based on aluminium and an activator based on boron. Activators that can be used in the present invention and their manufacturing method are described for example in the documents Sinn, H.: Kaminsky, W.; Vollmer, H. J.; Woldt, R.; Angew. Chem. Int. Ed. Engl, 19, 390 (1980) or Kaminsky, W.; Sinn, H.; Adv. Organomet. Chem. 18, 99 (1980) [10].

According to the invention, the activator of the catalyst can be chosen for example from the group comprising methylaluminoxate, trimethylaluminium, triisobutylaluminium or any other alkylaluminium.

According to the invention, the catalyst can be chosen for example from the group comprising a metal complex issuing from groups 4 to 10 in the periodic table (Mendeleev's table). Catalysts that can be used in the present invention are described for example in the documents Ittel, S. D.; Johnson, L. K.; Brookhard, M., Chem. Rev., 100, 1169 (2000) or Rappe, A. K.; Skiff, W. M.; Casewit, C. J.; Chem. Rev. 100, 1435 (2000) [12] or Gibson, V. C.; Spitmesser, S. K., Chem. Rev., 103 283 (2003) [13]. It may be a case for example of a metallocene or post-metallocene catalyst. It may be a case for example of a catalyst chosen from the group comprising a zirconocene, a catalyst based on iron and a catalyst based on nickel. "Based on iron" means for example (2,6-diacetylpyridinebis(2,6-diisopropylanil)) iron described by Britovsek, G. J. P.; Gibson, V. C.; Kimberley, B. S.; Maddox, J.; McTavish, S. J.; Solan, G. A.; White, A. P.; Williams, D.; Chem Commun, 849 (1998) [14]. "Based on nickel" means for example {Bis[N,N'-(2,6-diisopropylphenyl)imino] acenaphthene}dibromonickel described by Johnson, L. K.; Killian, C. M.; Brookhart, M.; J. Am. Chem. Soc., 117, 6414 (1995) [15].

The preparation of the catalytic system of the present invention therefore consists of producing functional and/or block (co)polymers capable of self-organising in solution in a selective solvent of one of the blocks or polar ends in the form of micelles, vesicles, aggregates or other supramolecular assemblies and using these for immobilising the activator complex. This will its turn strongly associate with the transition metal derivative used as a catalyst for leading to a catalytic complex of the supported type according to the invention.

Steps (c), (d), (e) and (f) are preferably formed with the following procedure particularities:

In step (c) the introduction of the said solvent on the molecules of the polymer is done so that the polymer molecules organise in aggregates, micelles or vesicles. The concentration of polymer may be 0.1 mg/ml to 50 mg/ml. It may for example be 18 mg/ml in the case of polystyrenes carrying a benzoic acid function at the chain end and between 0.5 and 1 mg/ml in the case of block copolymers. The introduction of solvent can be carried out by the simple addition of the said solvent on the polymer molecules or on a mixture of polymer molecules and organic molecules.

According to a particular embodiment of the method of the present invention, the said solvent can be added to a mixture of polymer molecules and organic molecules, for example benzoic acid when the polymer is a polystyrene functionalised by one or more benzoic acid functions. This is because the inventors of the present invention have remarked that this makes it possible to reinforce the supramolecular structure formed by the polymer in the solvent and to increase the size of the micelles. The concentration of benzoic acid added at the heart of the aggregates or and/or micelles may for example be 2 to 30 times greater than the concentration of polymer, preferentially 2 to 10 times greater.

In step (d) the addition of the catalyst activator is performed so that the latter diffuses in the said aggregates, micelles or vesicles formed in order to interact therein with the said functions and to be immobilised therein. The activator/benzoic acid molar ratio may for example be between 2 and 10 and preferentially between 3 and 5.

In step (e) the introduction of the monomer in the solvent is preferably performed continuously by bubbling of the gaseous monomer. Moreover, the monomer is preferably introduced to saturation in the solvent. This is because it is preferable for any traces of argon or nitrogen to be removed from the reaction medium before the introduction of the catalyst. The ethylene pressure may for example be between 1 and 50 bar, preferentially between 1 and 5 bar.

In step (f), the introduction of the catalyst into the reaction medium is achieved by simple addition after saturation of the medium by the monomer. The ratio of the concentrations (aluminic activator)/(catalyst) may for example be between 100 and 1000, preferentially between 300 and 500.

According to a particular embodiment of the method of the present invention, a heat treatment step (c1) intended to reduce the size of the aggregates, micelles or vesicles in the solvent can be applied after step (c) and before step (d). This heat treatment step can consist for example of a heating of the reaction medium under agitation. It can be performed for example by means of a hotplate. The temperature can be chosen for example between 20° C. and 80° C., for example 60° C.

The catalytic system of the present invention therefore consists of an organic carrier consisting of micelles or other equivalent structures, for example aggregates or vesicles, polymer molecules comprising at one or more of their ends a polar function incompatible with the polymerisation solvent and preferably having affinity with the catalytic system. It may be a case for example of molecules that are block copolymers in which the block incompatible with the polymerisation solvent has a high affinity with the catalytic system. The catalyst and the catalyst activator therefore penetrate inside the micelle and remain confined therein. Each micelle and/or vesicle and/or aggregate fulfils the role of a nanoreactor within which a chemical reaction can take place, for example a polymerisation reaction.

The catalytic system of the present invention can advantageously be used as a polymerisation catalyst for olefins. It may be a case for example of the polymerisation of an olefin chosen from the group comprising ethylene and propylene. The catalyst of the present invention makes it possible for example to polymerise the ethylene into polyethylene or the propylene into polypropylene. The catalytic system of the present invention also makes it possible to synthesise polyolefins that are copolymers, for example of ethylene and propylene. The polymerisation may for example be implemented in accordance with any one of the methods of the prior art, for example in liquid propylene, by replacing the catalyst of the prior art with a catalytic system according to the invention.

Thus the present invention also relates to a method of polymerising an olefin, for example ethylene, comprising the implementation of the method of manufacturing a catalytic system of the invention, and also comprising a saturation of the said solvent with the said olefin and a polymerisation of the said olefin catalysed by said catalytic system.

For example, when the polymer constituting the catalytic system of the present invention is a block copolymer, it is chosen so that the block incompatible with the polymerisation solvent, and therefore situated inside the micelle, vesicle or aggregate, has strong affinity with the catalyst and the catalysis activator enabling the latter to penetrate and remain confined inside the micelle. The polymerisation of the olefin takes place after diffusion of the monomer through the micelle, which immobilises/encapsulates the catalyst and its activator, thus forming a nanoreactor. This polymerisation using the micelles and/or aggregates of nanometric size as organic carriers for the catalytic systems leads to the obtaining of balls or grains of polyolefins of millimetric size and avoids the formation of fines.

This catalytic system of the present invention therefore very advantageously leads to the obtaining of polyolefin balls without the production of fines, which has never been achieved in the prior art. From an industrial point of view, it is clear that this absence of production of fines is important given in this industry since it is crucial for the correct functioning of the reactors. The inventors of the present document are the very first to have achieved "reactive" copolymer micelles as organic carriers for catalytic systems for the polymerisation of olefins. In general terms the present invention relates to the use of micelle structures, vesicles and/or aggregates, or more generally supramolecular objects based on copolymers for immobilising/encapsulating catalytic systems (metal complex+activator), for example for polymerising olefins.

The invention described in the project proposes to process in particular block copolymers and functional polymers quick to generate micelles and/or aggregates and/or vesicles in solution as novel organic carriers for this polymerisation catalyst and thus meets a requirement that has long been expressed by manufacturers.

In addition, the invention makes it possible to support catalysts and catalyst activators for polymerisation of olefins that have not been able to be supported up to the present time for various technical and/or chemical problems. This is because, in the techniques of the prior art, certain catalysts are highly deactivated when bonding them chemically to a carrier (the catalytic activity is generally reduced by a factor between a homogeneous and supported metallocene catalysis). This is the case in the following examples Soga, K.; Ban, H. T.; Arai, T.; Uozumi, T., Macromol. Chem. Phys., 198, 2779 (1997) [16] ou Barrett, A. G. M.; de Miguel, Y. R., Tetrahedron, 58, 3785 (2002) [17].

In addition, it appears that the other catalytic organic carrier systems currently published in the literature require, because of their structure, the use of a large quantity of aluminium derivatives to prevent the deactivation of the catalyst. This represents an additional cost and a restriction on the development of these new technologies, not presented by the technology proposed by the present invention.

In addition, as a person skilled in the art can note from a reading of the present description, one of the main advantages of the present invention is the simplicity of use of the carrier formed by these micelles and/or aggregates and/or vesicles, which is used at very low concentrations for an activity that is equivalent to or even greater than the catalysts of the prior art.

Moreover, the catalytic system of the present invention does not require a covalent bond between a carrier and the catalyst as in the prior art. The synthesis of the catalyst of the present invention is therefore simplified compared with the catalyst of the prior art. In addition, the ability of the catalytic system of the present invention to immobilise or encapsulate catalysts that could not be fixed to a carrier by the techniques of the prior art allows the creation of a new category of catalysts. In addition, in the techniques of the prior art, the presence of residues of inorganic carriers in the synthesised polymer material often impair the thermomechanical and optical (transparency) properties of the final material. With the catalytic system of the present invention, this drawback disappears. Moreover, the cost of the inorganic carriers of the prior art is much higher than the cost of the catalytic systems of the present invention.

In addition, the polyolefins synthesised using the catalytic system of the present invention have physical and chemical characteristics improved compared with those of the prior art. The catalyst and the catalyst activator penetrate inside the micelle and remain confined therein. This micelle fulfils the role of a nanoreactor within which the polymerisation reaction takes place.

From an industrial point of view it is clear that this absence of production of fines is an important given in this industry since it is crucial for the correct functioning of the reactors. In addition, it appears that the other organic carrier systems currently published in the literature require, because of their spectra, the use of a large quantity of aluminium derivatives for preventing the deactivation of the catalyst. This represents an additional cost, a restriction on the development of these novel technologies, not presented by the technology proposed in this processing dossier.

Other characteristics and advantages will be clear to a person skilled in the art from a reading of the following examples given by way of illustration and non-limitatively, with reference to the accompanying figures.

BRIEF DESCRIPTION OF THE FIGURES

FIGS. 6a and 6b show two photographs of polyethylene grains obtained in the presence of a catalytic system according to the present invention.

FIGS. 7a and b show two photographs obtained by scanning electron microscopy (SEM) of polyethylene obtained in the presence of a catalytic system according to the present invention.

EXAMPLES

Example 1

Synthesis of Copolymers

Linear polystyrenes carrying a benzoic acid (BA) function at the end of the chain as well as linear poly(styrene-b 4-vinyl benzoic acid) (poly(St-b-BA) diblock copolymers are synthesised by Atom Transfer Radical Polymerisation (ATRP).

The polystyrenes carrying a terminal benzoic acid function are obtained by en mass polymerisation of the styrene using a 4-(1-bromo ethyl)benzoic acid initiator, as indicated in diagram 2 below.

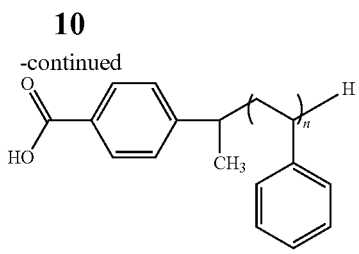

The block copolymers are synthesised by en mass sequenced polymerisation of styrene and 4-vinyl methyl benzoate. The transformation of the ester function into a benzoic acid function is achieved in a second step by saponifiction reaction. The process of synthesis of the block copolymers (poly(St-b-BA) is summarised in diagram 3 below:

Diagram 3: Synthesis of the poly(styrene-b 4-vinyl benzoic acid) copolymers by ATRP.

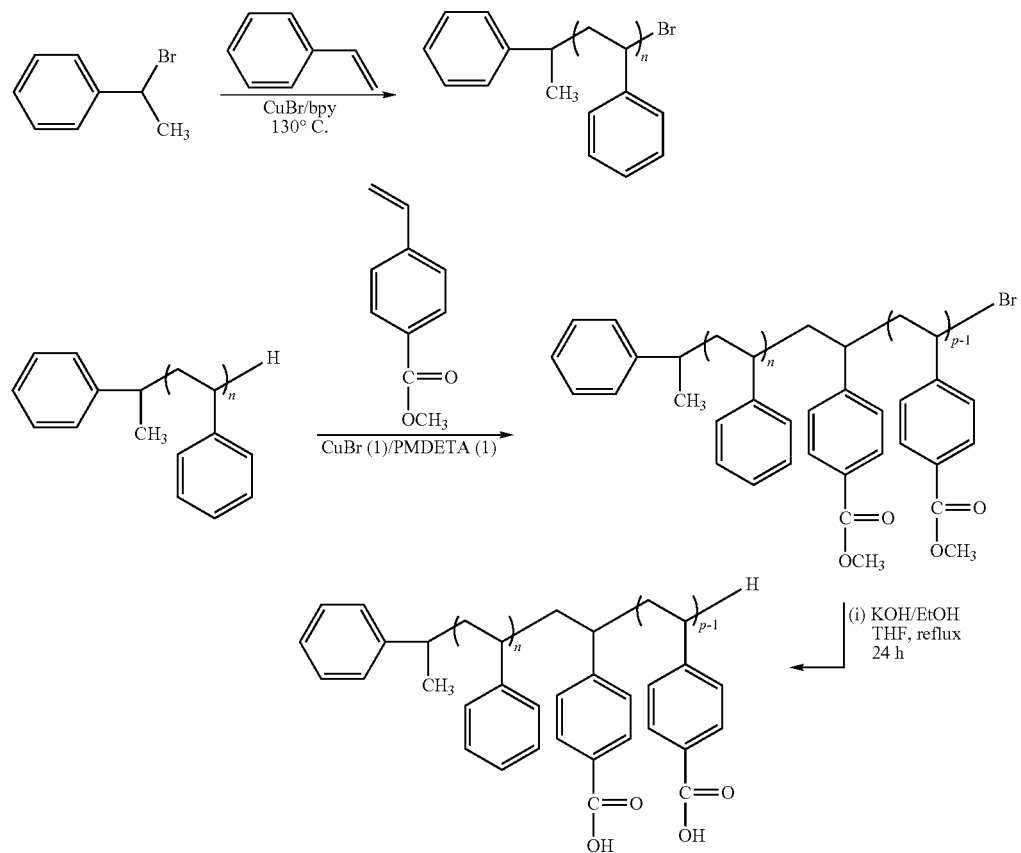

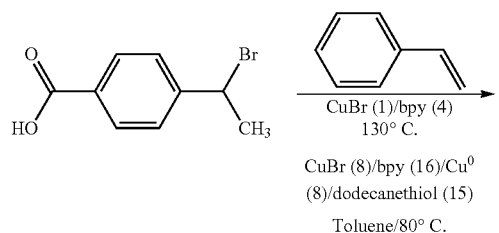

Diagram 2: Synthesis by ATRP of linear polystyrene carrying a benzoic acid function The characteristics of the copolymers are set out in table 1 below:

TABLE 1

Characteristics of the linear polystyrenes carrying a benzoic acid function and poly(styrene-b 4-vinyl benzoic acid) diblock copolymers synthesised by ATRP

| | Mn block PS (g/mol) | Number of BA units | Total Mn of block copolymers (g/mol) |
|---|---|---|---|
| poly(St35-b-AB1) | 3600 | 1 | 3600 |
| poly(St23-b-BA2) | 2400 | 2 | 2700 |

TABLE 1-continued

Characteristics of the linear polystyrenes carrying
a benzoic acid function and poly(styrene-b 4-vinyl benzoic
acid) diblock copolymers synthesised by ATRP

|  | Mn block PS (g/mol) | Number of BA units | Total Mn of block copolymers (g/mol) |
|---|---|---|---|
| poly(St23-b-BA8) | 2400 | 8 | 3200 |
| poly(St23-b-BA16) | 2400 | 16 | 5000 |

Mn = mean molar mass in numbers

Example 2

Putting Copolymers in Solution: Micellisation

In solution in toluene, the linear polystyrenes manufactured in example 1 carry one or more benzoic acid functions organised to form micellar objects and micelle aggregates, with a size of approximately 200 nm. This behaviour is explained by the fact that toluene is a good solvent of polystyrene but not of 4-vinyl benzoic acid units, which self-assembly to form the core of the micellar objects.

Figure 1:
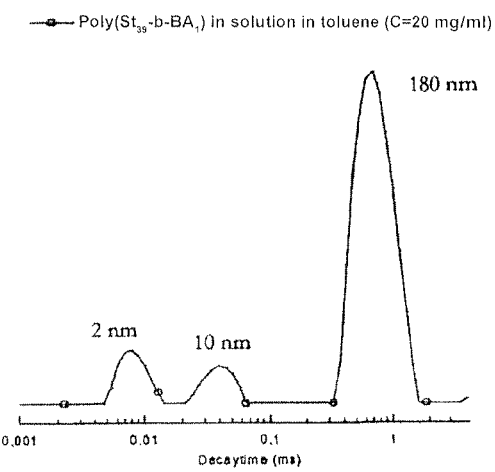
FIG. 1 is a graph for the diffusion of the light from a linear polystyrene solution functionalised by benzoic acid in toluene (C=20 mg/ml).

Associated auto system obtained from a polystyrene carrying a benzoic acid terminal function, with a molar mass of 3600 g/mol, in toluene: the size and distribution of the objects formed in toluene, measured by diffusion of light, are presented in the accompanying FIG. 1.

Figure 2:
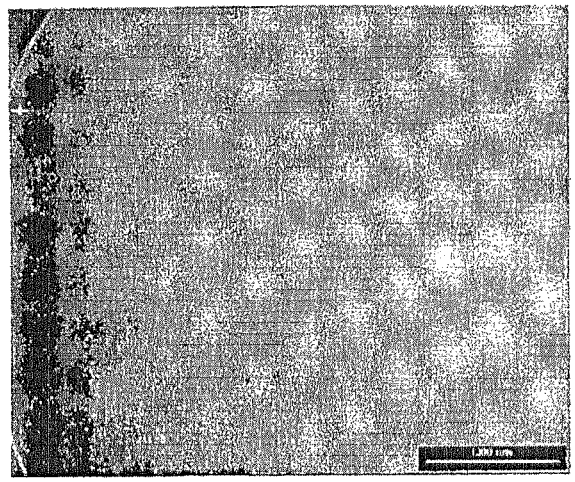
FIG. 2 shows a transmission electron microscopy (TEM) image of the micelles and aggregates of micelles of linear polystyrene functionalised by one or more benzoic acid units after organisation in toluene.

These results were confirmed by transmission electron microscopy (TEM) as testified to by the photograph presented in the accompanying FIG. 2, which is a transmission electron microscopy (TEM) image of the micelles and aggregates and micelles of linear polystyrene functionalised by one or more benzoic acid units after organisation in toluene.

Figure 3:
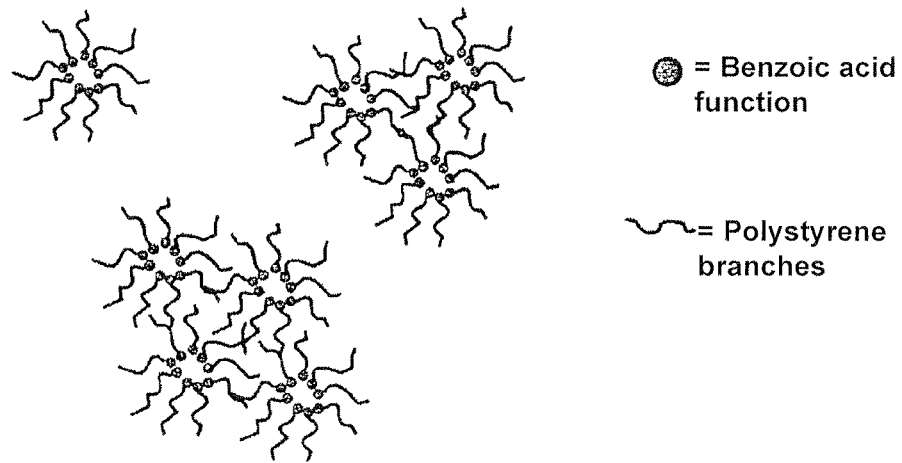
FIG. 3 shows schematically the micellar organisation of the polystyrenes functionalised by a benzoic acid function.

The results obtained by light diffusion and TEM confirm a micellar organisation of the polystyrenes characterised by a benzoic acid "core" surrounded by PS branches. These micelles next self-associate in larger aggregates according to the experimental conditions. FIG. 3 illustrates this micellar organisation.

Addition of Benzoic Acid in the Micelles

The simultaneous putting in solution, in neat toluene, of polystyrenes functionalised by one or more benzoic acid units and free benzoic acid molecules reinforces the micellar structures. This is because, under these conditions, an appreciable increase in the size of the micelle aggregates (from 200 to 700 nm) is observed by light diffusion. The "free" benzoic acid is "trapped" or encapsulated at the core of the micelles.

By way of indication the number of free benzoic acid moles added to the medium is, in the present case, 10 times greater than the quantity of benzoic acid attached to the PS.

Example 3

Synthesis of Methylaluminoxane (MAO) within the Micelles

For the purpose of synthesising MAO, which is an activator of metallocenes and post-metallocenes, within the micellar systems manufactured in the above example, TMA is then added to the medium.

The TMA diffuses inside the micelles and then reacts with the encapsulated benzoic acid (see benzoic acid/TMA reaction described above). After two days of reaction at 60° C., a new analysis of the solution by diffusion of light shows that the size of the aggregates before and after the addition of TMA remains of the same order of magnitude. This is explained by the reaction of the TMA at the core of the micelles in order to form the aluminic compound with a structure of the MAO type.

It should be noted that, if the TMA had remained at the periphery of the micelles, a substantial increase in the size of the micelles and aggregates would have had to be observed. The data obtained by light diffusion after the addition of free benzoic acid and then TMA are indicated in table 2 below.

TABLE 2

Change in the hydrodynamic radius (Rh) of the
objects formed from linear polystyrene functionalised at
chain end by a benzoic acid unit, in toluene in the presence
of an excess of "free" benzoic acid and then TMA

|  | Rh of the objects obtained from the copolymer alone | Rh of the objects obtained from the copolymer in the presence of "free" benzoic acid (n × 10) | Rh of the objects obtained from the copolymer in the presence of "free" benzoic acid and TMA |
|---|---|---|---|
| Poly (St35-b-BA1) | 2 nm; 10 nm; 180 nm | 1.8 nm; 9.8 nm; 150 nm; 770 nm | 1.8 nm; 9.8 nm; 150 nm; 770 nm |

Figure 4:
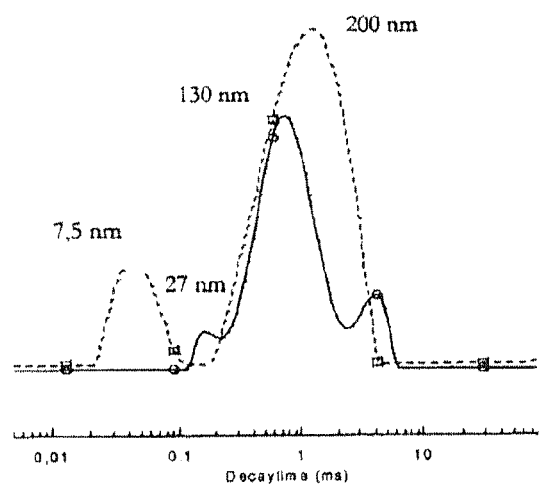
FIG. 4 shows a graph for the diffusion of light from linear poly(styrene-b 4-vinyl benzoic acid) diblock copolymers in solution in toluene.

The study by diffusion of light of the poly(ST-b-BAx) diblock copolymers in solution in toluene confirms the above results and emphasises, for a PS block of fixed size (Mn=2400 g/mol), the influence of the number of 4-vinyl benzoic acid units on the size of the object formed. An increase in the number of BA units results in fact in an increase in the hydrodynamic radius of the micelle: Rh changes from 7.5 nm for poly(St23-b-BA2) to 27 nm for poly(St23-b-BA8). In all cases, micelle aggregates with a size of between 100 and 660 nm are also observed. These observations are illustrated in the accompanying FIG. 4, which shows a graph of diffusion of the light from linear poly(styrene-b 4-vinyl benzoic acid) diblock copolymers, containing 2 or 5 BA units, in solution in toluene at 25°.

Finally, and as expected, an increase in the temperature makes it possible to modify the size of the objects formed and to obtain generally micellar objects with a smaller size and a narrower distribution.

Figure 5:
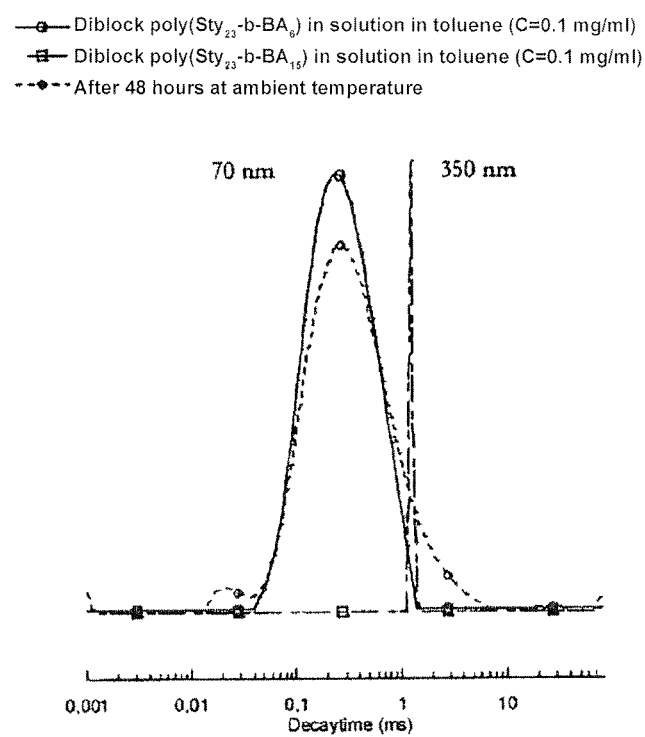
FIG. 5 shows a graph for the diffusion of light from poly (styrene-b4-vinyl benzoic acid) diblock copolymers in solution in toluene.

By way of example, the poly(St-b-BA8) copolymer that forms objects of 27 and 130 nm at 25° C. (see FIG. 4) is in the form of a single population with a hydrodynamic radius of 70 nm, after heating at 60° C. (see FIG. 5). It is interesting to note that, after return to ambient temperature, the size of these objects no longer varies. Finally, the length of the 4-vinyl benzoic acid block determines the size of the micelles (or vesicles, or aggregates). As illustrated in the accompanying FIG. 5, which shows a graph of diffusion of the light from poly(styrene-b 4-vinyl benzoic acid) diblock copolymers in solution in toluene at 60° C., the poly(St-b-BA16) copolymer organises itself at 60° C. in the form of aggregates of size 350 nm with a very narrow size distribution.

Example 4

Polymerisation of Ethylene in the Presence of Micellar Carriers and Micelle Aggregates The micelles and/or micelle aggregates in which aluminic derivatives of the MAO type are immobilised, issuing from the reaction between TMA and benzoic acid, are then used as catalyst carriers for the polymerisation of olefins.

To do this, the solution is saturated with ethylene at a pressure of 1 bar. After a few minutes, the (post-metallocene) catalyst MeDIP(2,6-iPrPh)$_2$FeCl2 is introduced into the medium. The latter is added, alone, to the solution, with the objective of diffusing within the micelles and/or aggregates.

The operating conditions are summarised in table 3 below.

TABLE 3

Polymerisation of ethylene in the presence of micelles of benzoic acid functionalised linear polystyrenes associated with free benzoic acid in toluene

| System studied | C (mg/ml) | TMA/BA (total) | Al/Fe | Activity (kg PE/mol Fe.h.bar) | Density (g/l) |
|---|---|---|---|---|---|
| poly(St35-b-AB1) associated with free benzoic acid (n × 10) in solution in toluene | 20<br>20 | 3<br>3 | 300<br>500 | 1425<br>1540 | 300<br>290 |
| poly(St35-b-AB1) associated with free benzoic acid (n × 5) in solution in toluene | 20<br>20 | 3<br>3 | 300<br>500 | 900<br>1110 | 350<br>290 |
| poly(St35-b-AB1) associated with free benzoic acid (n × 2) in solution in toluene | 20 | 3 | 430 | 675 | 250 |
| poly(St23-b-AB8) in solution in toluene | 2.5<br>1 | 5<br>5 | 330<br>330 | 2980<br>2000 | —<br>— |

The micelles of the functional (co)polymers containing the aluminic activator of MAO type are excellent "active carriers", in particular vis-à-vis the iron-based catalyst. This is because, after the addition of ethylene, the solution becomes cloudy, in accordance with the formation of polyethylene, which then precipitates.

The catalytic activities indicated in table 3 above are very high and comparable with those that are obtained in homogeneous phase without carriers.

Finally, the decisive role of the carrier on the morphology of the PE formed emerges irrefutably in the light of the microscopy photographs that show the obtaining of polyethylene grains. The measurements of density of the polyethylenes formed are also along the same lines. Different grain sizes are obtained according to the structure of the carrier used as illustrated in the accompanying FIGS. 6 and 7.

FIGS. 6a and b: photographs of polyethylene grains obtained in the presence of aggregates of polystyrene chains carrying a BA unit and containing free benzoic acid (TMA/BA=3, Al/Fe=300).

FIGS. 7a and b: BEM images of the polyethylene obtained in the presence of micelles of poly(St-b-BA8) diblock copolymers used as carriers (TMA/BA=5, Al/Fe=330).

LIST OF REFERENCES

[1] Matyjaszewski, K.; Eds.; Advances in Controlled/Living Radical Polymerization, (American Chemical Society 2003).
[2] Hsieh, H. L.; Quirk, R. P.; Eds.; Anionic Polymerization Principles and Practical Applications, (Marcel Dekker 1996).
[3] Matyjaszewski, K.; Davies, T. P; Eds.; Handbook of Radical Polymerization, (Wiley-Interscience 2002).
[4] Fontaine, L.; Initiation in Macromolecular Chemistry and Physico-Chemistry (Groupe Français d'Etudes et d'Applications des Polyméres volume 12 (Chapter 3)).
[5] Matyjaszewski, K.; Eds.; Cationic Polymerizations Mechanisms, Synthesis, and Applications, (Marcel Dekker 1996).
[6] Ishizone, T.; Kurosawa, H.; Hirao, A.; Nakahama, S.; Macromol. Chem. Phys. 195, 3173 (1994).
[7] Ishizone, T.; Hirao, A.; Nakahama, S., Macromolecules, 22, 2895 (1989).
[8] Ishizone, T.; Hirao, A.; Nakahama, S., Macromolecules, 26, 6964 (1993).
[9] Sinn, H.; Kaminsky, W.; Vollmer, H. J.; Woldt, R.; Angew. Chem. Int. Ed. Engl, 19, 390 (1980).
[10] Kaminsky, W.; Sinn, H.; Adv. Organomet. Chem., 18, 99 (190).
[11] Ittel, S. D.; Johnson, L. K.; Brookhart, M., Chem. Rev., 100, 1169 (2000).
[12] Rappe, A. K.; Skiff, W. M.; Casewit, C. J.; Chem. Rev., 100, 1435 (2000).
[13] Gibson, V. C.; Scitzmesser, S. K., Chem. Rev., 103, 283 (2003).
[14] Britovsek, G. J. P.; Gibson, V. C.; Kimberley, B. S.; Maddox, J.; McTavish, S. J.; Solan, G. A.; White, A. P.; Williams, D.; Chem. Commun, 849 (1998).
[15] Johnson, L. K.; Killian, C. M.; Brcokhart, M.; J. Am. Chem. Soc., 117, 6414 (1995).
[16] Soga, K.; Ban, H. T.; Arai, T.; Uozumi, T., Macromol. Chem. Phys., 198, 2779 (1997).
[17] Barrett, A. G. M.; de Miguel, Y. R., Tetrahedron, 58, 3785 (2002).

The invention claimed is:

1. A catalytic system, characterised in that it comprises:
   molecules of a polymer comprising a polar function at one of its ends;
   a solvent, said solvent, because of said polar function of said polymer, causing and maintaining, when said solvent is introduced on said molecules of the polymer, an organisation of said molecules of the polymer in aggregates, micelles or vesicles so that the polar functions of said polymer are situated inside the aggregates, micelles or vesicles formed; and
   a catalyst activator and a catalyst confined in said aggregates, micelles or vesicles of said polymer;
   wherein the polymer is a linear block copolymer or a statistical copolymer, one of the monomers carrying the polar function.

2. The catalytic system according to claim 1, in which the polar function is chosen from the group consisting of a benzoic acid function, an alcohol function, a phenol function, an ester function, and a ketone function.

3. The catalytic system according to claim 1, in which the block copolymer is a diblock copolymer synthesised by controlled radical polymerisation or living anionic polymerisation or living cationic polymerisation or a statistical copolymer synthesised by controlled radical polymerisation or non-controlled radical polymerisation.

4. The catalytic system according to claim 1, in which the polymer comprising a polar function at one of its ends is a linear polystyrene carrying a benzoic acid function or a poly (styrene-b 4-vinyl benzoic acid) diblock copolymer.

5. The catalytic system according to claim 1, in which solvent is chosen from the group consisting of ethylbenzene, toluene, hexane, isododecane, heptane and any other higher alkane.

6. The catalytic system according to claim 1, in which the catalyst activator is chosen from the group consisting of an aluminic activator and an activator based on aluminium and boron.

7. The catalytic system according to claim 6, in which the catalyst activator is chosen from the group consisting of methylaluminoxane, trimethylaluminium, triisobutylaluminum and any other alkylaluminium.

8. The catalytic system according to claim 1, in which the catalyst is a metal complex comprising metals from groups 4 to 10 of the periodic table.

9. The catalytic system according to claim 8, in which the catalyst is chosen from a zirconocene, an iron-based catalyst or a nickel-based catalyst.

10. A method of manufacturing a catalytic system, said method comprising the following steps:
  (a) choosing a polymer comprising a polar function at one of its ends and capable of being organised in a suitable solvent so as to form aggregates, micelles or vesicles so that the polar functions of said polymer are situated inside the aggregates, micelles or vesicles, wherein the polymer is a linear block copolymer or a statistical copolymer;
  (b) choosing the suitable solvent so that it causes and maintains, when molecules of the polymer are introduced therein, an organisation of said molecules of the polymer in aggregates, micelles or vesicles so that the polar functions of the polymer are situated inside the aggregates, micelles or vesicles formed;
  (c) introducing said solvent on the molecules of the polymer so that the polymer molecules are organised in aggregates, micelles or vesicles;
  (d) adding a catalyst activator which, because of the polar functions of the polymer molecules, diffuses in the said aggregates, micelles or vesicles formed in order to interact therein with said functions and to be immobilised therein; in the order (e) and then (f) or (f) and then (e);
  (e) introducing a monomer;
  (f) introducing a catalyst in the solvent, said catalyst diffusing in said aggregates, micelles or vesicles in order to form said catalytic system.

11. The method according to claim 10, in which the polar function is chosen from the group consisting of a benzoic acid function, an alcohol function, a phenol function, an ester function and a ketone function.

12. The method according to claim 10, in which the block copolymer is a diblock copolymer synthesised by controlled radical polymerisation or living anionic polymerisation or living cationic polymerisation or a statistical copolymer synthesised by controlled radical polymerisation or non-controlled radical polymerisation.

13. The method according to claim 10, in which the polymer comprising a polar function at one of its ends is a linear polystyrene carrying a benzoic acid function or a polystyrene-b 4-vinyl benzoic acid) diblock copolymer.

14. The method according to claim 10, in which the solvent is toluene.

15. The method according to claim 10, in which the activator of the catalyst is chosen from the group consisting of an aluminic activator and a boron-based activator.

16. The method according to claim 15, in which the catalyst activator is chosen from the group consisting of methylaluminoxane and trimethylaluminium.

17. The method according to claim 10, in which the catalyst is a metal complex comprising metals from groups 4 to 10 of the periodic table.

18. The method according to claim 17, in which the catalyst is chosen from a zirconocene, an iron-based catalyst and a nickel-based catalyst.

19. The method according to claim 10, in which, after step (c) and before step (d), there is applied a step (c1) of heat treatment intended to reduce the size of the aggregates, micelles of vesicles in the solvent.

20. The method according to claim 10, wherein the introducing of the monomer is continuous.

21. The method according to claim 10, wherein the introducing of the monomer continues until the solvent is saturated with monomer.

* * * * *